(12) United States Patent
Duraffourg et al.

(10) Patent No.: US 10,866,214 B2
(45) Date of Patent: Dec. 15, 2020

(54) PHOTOACOUSTIC SENSOR WITH OPTOMECHANICAL COUPLING

(71) Applicant: COMMISSARIAT A L'ENERGIE ATOMIQUE ET AUX ENERGIES ALTERNATIVES, Paris (FR)

(72) Inventors: Laurent Duraffourg, Grenoble (FR); Pierre Labeye, Grenoble (FR); Boris Taurel, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 134 days.

(21) Appl. No.: 16/274,341

(22) Filed: Feb. 13, 2019

(65) Prior Publication Data
US 2019/0257796 A1    Aug. 22, 2019

(30) Foreign Application Priority Data

Feb. 19, 2018 (FR) ...................... 18 51405

(51) Int. Cl.
  *G01N 29/24*   (2006.01)
  *G01N 21/17*   (2006.01)
  *G01N 29/036*  (2006.01)
(52) U.S. Cl.
  CPC ..... *G01N 29/2425* (2013.01); *G01N 21/1702* (2013.01); *G01N 29/036* (2013.01); *G01N 2021/1704* (2013.01)
(58) Field of Classification Search
  CPC ................................ G01N 29/24; G01N 21/17
  See application file for complete search history.

(56) References Cited

U.S. PATENT DOCUMENTS 5,559,358 A * 9/1996 Burns ................ G01J 5/44
  257/415
7,245,380 B2 * 7/2007 Kosterev ............ G01N 21/1702
  250/343

(Continued)

FOREIGN PATENT DOCUMENTS

EP       2 543 987 A1      1/2013

OTHER PUBLICATIONS

U.S. Appl. No. 16/193,609, filed Nov. 16, 2018, Boris Taurel, et al.
(Continued)

*Primary Examiner* — Jewel V Dowtin
(74) *Attorney, Agent, or Firm* — Oblon, McClelland, Maier & Neustadt, L.L.P.

(57) ABSTRACT

An element of a photoacoustic sensor combines an optomechanical resonator and a photoacoustic cavity. The photoacoustic cavity is formed by a measurement chamber, traversed by a pulsed excitation beam. The optomechanical resonator is formed by an optical resonator, a mechanical element for being set in rapid oscillations, by an optical signal confined in the optomechanical resonator, and in slow oscillations, by an acoustic wave generated in the photoacoustic cavity. A measurement beam is sent into the optical resonator, where it carries out several passages via the mechanical element. The optical properties thereof at the output of the optical resonator are therefore dependent on the oscillations of the mechanical element. A low-frequency-amplitude-modulated high-frequency signal can be obtained, with the amplitude modulation representing the acoustic wave in the measurement chamber. An accurate, low-noise, and highly compact method is enabled for making measurements with a photoacoustic effect.

15 Claims, 5 Drawing Sheets

(56) References Cited

U.S. PATENT DOCUMENTS

| | | | |
|---|---|---|---|
| 8,857,242 B2* | 10/2014 | Heidrich | G01N 29/036 |
| | | | 73/24.02 |
| 9,360,417 B2* | 6/2016 | Disch | G01N 21/3504 |
| 10,216,698 B2 | 2/2019 | Ernst et al. | |
| 2011/0072886 A1* | 3/2011 | Caneau | G01N 21/1702 |
| | | | 73/24.02 |
| 2017/0059499 A1 | 3/2017 | Duraffourg | |
| 2017/0089944 A1 | 3/2017 | Duraffourg | |
| 2018/0039024 A1 | 2/2018 | Boutami et al. | |
| 2019/0011261 A1 | 1/2019 | Taurel et al. | |
| 2019/0113443 A1* | 4/2019 | Gidon | G01N 21/1702 |

OTHER PUBLICATIONS

U.S. Appl. No. 16/322,254, filed Jan. 31, 2019, Salim Boutami, et al.

U.S. Appl. No. 16/274,341, filed Feb. 13, 2019, Laurent Duraffourg, et al.

French Preliminary Search Report dated Jun. 21, 2018 in French Application 18 51405, filed on Feb. 19, 2018 (with English Translation of Categories of Cited Documents).

Churenkov, A., et al. "Photothermal excitation and self-excitation of silicon microresonators", Sensors and Actuators A: Physical, vol. 39, No. 2, 1993, pp. 141-148.

Hossein-Zadeh, M., et al. "An Optomechanical Oscillator on a Silicon Chip", IEEE Journal of Selected Topics in Quantum Electronics, vol. 16, No. 1, 2010, pp. 276-287.

Rouxel, J., et al. "Miniaturized differential Helmholtz resonators for photoacoustic trace gas detection", Sensors and Actuators B 236, 2016, pp. 1104-1110.

Laurila, T., et al. "Diode laser-based photoacoustic spectroscopy with interferometrically-enhanced cantilever detection", Optics Express, vol. 13, No. 7, 2005, pp. 2453-2458.

* cited by examiner

10,866,214 B2

PHOTOACOUSTIC SENSOR WITH OPTOMECHANICAL COUPLING

TECHNICAL FIELD

The invention relates to a photoacoustic sensor, based on the generation of an acoustic wave induced by the absorption of a light pulse by a gaseous, or liquid, medium.

STATE OF THE RELATED ART

In the prior art, photoacoustic sensors are known including
a measurement chamber, receiving a gaseous mixture to be analysed; and
a light source, sending laser pulses into the measurement chamber.

The wavelength of laser pulses corresponds to an absorption wavelength, characteristic of a gas whereof it is sought to measure the concentration in the measurement chamber. In the presence of this gas in the measurement chamber, each laser pulse is in part absorbed, which generates a local temperature rise in the measurement chamber. This local temperature rise in turn generates a pressure wave in the measurement chamber, referred to as an acoustic wave. This effect is referred to as the photoacoustic effect. The pressure wave is measured using a microphone placed in the measurement chamber.

Such a sensor is described for example in the article by J. Rouxel & al., "*Miniaturized differential Helmholtz resonators for photoacoustic trace gas detection*", Sensors and Actuators B, pp. 1104-1110.

In this article, the authors propose more specifically an assembly including two similar measurement chambers, interconnected by two parallel ducts. Only one of the chambers receives the laser pulses, but each is equipped with a microphone. It is thus possible to make a differential measurement of the acoustic wave.

The lowest concentration of gas that can be detected by the photoacoustic sensor defines the limit of detection of the sensor.

This value is limited in particular by the signal-to-noise ratio of the microphone.

Various solutions have therefore been proposed, to do away with the need for the microphone.

It is known, for example, to use preferably a quartz tuning fork wherein both arms frame the focal point of the laser pulses in the measurement chamber. This solution is mentioned in the article cited above. The improvement in respect of the limit of detection remains however limited as the tuning forks used have high resonance frequencies compared to the maximum frequency for which the gas molecules absorb the optical power without saturation (this frequency is set by the characteristic molecular relaxation time, typically less than 30 µs, or a 30 kHz maximum bandwidth).

It is also known to carry out an optical type measurement, using a cantilever beam placed in the measurement chamber, and set in oscillation by the acoustic wave. The movement of the beam is measured using a laser beam which is reflected thereon. Such a sensor is described for example in the article by Toni Laurila & al., "*Diode laser-based photoacoustic spectroscopy with in terferometrically-enhanced cantilever detection*", Optics Express, Vol. 13, No. 7, pp 2453-2458. This solution makes it possible to reduce the limit of detection of the sensor, but offers low resolution.

An aim of the present invention is that of proposing a photoacoustic sensor, offering a substantial reduction of the limit of detection, compared with sensors according to the prior art based on the use of a microphone, with no loss of resolution.

DESCRIPTION OF THE INVENTION

This aim is achieved with a photoacoustic sensor including:
a measurement chamber, suitable for receiving a gaseous or liquid medium; and
an emission source, for emitting an amplitude-modulated excitation light beam at a so-called excitation frequency;
the photoacoustic sensor being arranged such that the excitation light beam is propagated in the measurement chamber, and the excitation light beam having a spectral component suitable for generating a pressure wave in the measurement chamber in the presence of a predetermined characteristic of the gaseous or liquid medium, the pressure wave being referred to as an acoustic wave.

According to the invention, the photoacoustic sensor further comprises:
an optical resonator, situated in the measurement chamber, and comprising at least one mechanical element which is movably mounted and/or deformable about an elastic return position or an elastic return shape; and
an emission source, for emitting a measurement light beam, separate or merged with the emission source for emitting the excitation light beam;
the photoacoustic sensor being arranged so that the measurement light beam carries out a plurality of passages in the optical resonator by passing via the movable and/or deformable mechanical element, and the movable and/or deformable mechanical element being suitable for being set in oscillation both by an optical signal confined in the optical resonator and by an acoustic wave generated in the measurement chamber.

The measurement light beam, at the output of the optical resonator, then has optical properties which are dependent on the oscillations of the movable and/or deformable mechanical element.

As in the prior art, detection is based on the generation of an acoustic wave in the measurement chamber, due to a photoacoustic effect, and using the excitation light beam.

The excitation light beam has a spectral component at an absorption wavelength, absorbed by the gaseous or liquid medium in the presence of a predetermined characteristic thereof. Said predetermined characteristic may be the presence of a predetermined gas, or the presence of a predetermined gas family.

The optical resonator forms an optical device wherein light beams are suitable for remaining confined. The confinement of the light energy in the optical resonator is dependent on the wavelength thereof, relative to resonance peaks of the optical resonator. The resonance peaks are each centred on a resonance wavelength, for which the phase shift added by a turn in the resonator is a multiple of $2\pi$. The optical resonator is for example a macro-resonator, of the linear cavity type, or a micro-resonator, of the resonant ring type.

According to the invention, the optical resonator includes a mechanical element, movably mounted and/or deformable about an elastic return position or an elastic return shape. In other words, the mechanical element is suitable for moving and/or being deformed under the effect of a pressure force, and for returning to the initial position thereof, respectively the initial shape thereof, when said pressure force is no longer applied. Said initial position or shape, respectively, is referred to as the elastic return position or shape, respectively.

The movable and/or deformable mechanical element is suitable for being set in mechanical oscillation, under the effect of the radiation pressure exerted by an optical signal confined in the optical resonator. The mechanical element, situated initially at a position where the radiation pressure is high, is slightly moved or deformed under the effect of this pressure. This movement or this deformation reduces the radiation pressure which is exerted on the mechanical element, which then returns to the initial position thereof or to the initial shape thereof, and so on. This mechanical oscillation phenomenon is referred to as "self-oscillation". The movable and/or deformable mechanical element thus forms an optomechanical resonator.

The optical signal generating the self-oscillation may be formed by the measurement light beam, or by a supplementary light beam referred to as pump beam.

The self-oscillation frequency is defined by mechanical characteristics of the optical resonator, when the optical signal exerting the radiation pressure is a continuous signal. Alternatively, the self-oscillation frequency may correspond to the frequency of an amplitude modulation of the optical signal exerting the radiation pressure. In any case, the self-oscillation frequency is generally greater than or equal to 100 kHz, and preferably between 100 kHz and 1 GHz, inclusive.

The movable and/or deformable mechanical element is also suitable for being set in mechanical oscillation by the acoustic wave generated in the measurement chamber. The frequency of the acoustic wave is equal to the frequency of the excitation light beam, which does not exceed some tens of kHz for the photoacoustic effect to be effective. Thus, the oscillation associated with the photoacoustic effect forms a low-frequency signal (low-frequency amplitude modulation), relative to the self-oscillation (high frequency).

In operation, an acoustic wave is generated in the measurement chamber, by a photoacoustic effect. This acoustic wave exerts a pressure force on the movable and/or deformable mechanical element, set in self-oscillation by an optical signal confined in the optical resonator.

The movable and/or deformable mechanical element is therefore strained mechanically both by the acoustic wave, and by the radiation pressure of the optical signal confined in the optical resonator. It is moved according to an oscillation movement combining the respective effects of these two strains.

This movement is conveyed, on the measurement light beam emerging from the optical resonator after carrying a plurality of passages therein, by a variation of the intensity as a function of time. The measurement light beam emerging from the optical resonator thus includes a high-frequency component associated with self-oscillation and a low-frequency component associated with the acoustic wave. It can be considered that self-oscillation (associated with an optical force, herein the radiation pressure) supplies a carrier for the oscillation associated with the acoustic wave.

The low-frequency component provides information on the amplitude of the acoustic wave, which is dependent on the measurement wherein the predetermined characteristic is found in the measurement chamber (concentration of a predetermined gas, for example). This information is contained in particular in the peak-to-peak amplitude of the low-frequency component, and in a phase difference with the measurement light beam at the input of the optical resonator.

The high-frequency component provides access to substantially superior signal-to-noise ratios than in the prior art.

The photoacoustic sensor according to the invention is therefore based on an optical type detection, with no microphone. It enables a substantial reduction in the limit of detection, in comparison with the sensors according to the prior art, and without affecting the measurement resolution. On the contrary, the invention also offers superior measurement resolutions to those of the prior art.

According to the invention, the relevant information is particularly found in a phase difference. It is thus possible to carry out a gas concentration measurement on a phase, which provides access to further enhanced resolutions.

The invention also offers increased miniaturisation capabilities, in comparison with the prior art.

It is noted that the measurement light beam has a probe function, to convert in real time a position of the movable and/or deformable mechanical element into an amplitude value. If applicable, it may further have a pump function, to exert a radiation pressure on the movable and/or deformable mechanical element, and thus generate the self-oscillation movement described above.

Throughout the text, "photoacoustic sensor" refers to a device which does not include the elements for carrying out a measurement on the measurement light beam emerging from the optical resonator, and which likewise does not include a computer to convert a measurement made on the measurement light beam emerging from the optical resonator into information relative to the gaseous or liquid medium in the measurement chamber, for example a concentration of a predetermined chemical species. More strictly, reference is rather made, in the claims, to an "element of a photoacoustic sensor".

According to an advantageous embodiment, the measurement light beam has an emission peak centred on a measurement wavelength, the measurement wavelength being situated on a resonance peak of the optical resonator at rest, the optical resonator being described as at rest in the absence of the acoustic wave in the measurement chamber and in the absence of an optical signal confined in the optical resonator.

The measurement wavelength may correspond to the maximum of said resonance peak.

Alternatively, the measurement wavelength may be situated on a slope of said resonance peak.

Alternatively, the measurement light beam has an emission peak centred on a measurement wavelength, the measurement wavelength being situated on a resonance peak of the optical resonator at equilibrium, the optical resonator being described as at equilibrium when it is situated midway between the two extreme positions thereof during the oscillation movement thereof, in the absence of the acoustic wave in the measurement chamber. The measurement wavelength may correspond to the maximum of said resonance peak. Alternatively, the measurement wavelength may be situated on a slope of said resonance peak.

Advantageously, the photoacoustic sensor further has a pump beam emission source, the pump beam having an emission peak centred on a wavelength corresponding to the maximum of a resonance peak of the optical resonator at rest.

Alternatively, the photoacoustic sensor further has a pump beam emission source, the pump beam having an emission peak centred on a wavelength corresponding to the maximum of a resonance peak of the optical resonator at equilibrium, the optical resonator being described as at equilibrium when it is situated mid-way between the two extreme positions thereof during the oscillation movement thereof, in the absence of the acoustic wave in the measurement chamber.

In any case, the resonance peaks of the optical resonator at equilibrium and the resonance peaks of the optical resonator at rest are substantially superimposed, such that the different alternative embodiments listed above are practically equivalent in pairs.

The optical resonator may be a linear cavity delimited by two mirrors. In this case, an optical path of the excitation light beam in the measurement chamber may extend parallel relative to an optical path of the measurement light beam in the optical resonator, within plus or minus 10°.

BRIEF DESCRIPTION OF THE FIGURES

The present invention will be understood more clearly on reading the description of examples of embodiments given merely by way of indication and not limitation, with reference to the appended figures wherein.

DETAILED DESCRIPTION OF PARTICULAR EMBODIMENTS

Figure 1:
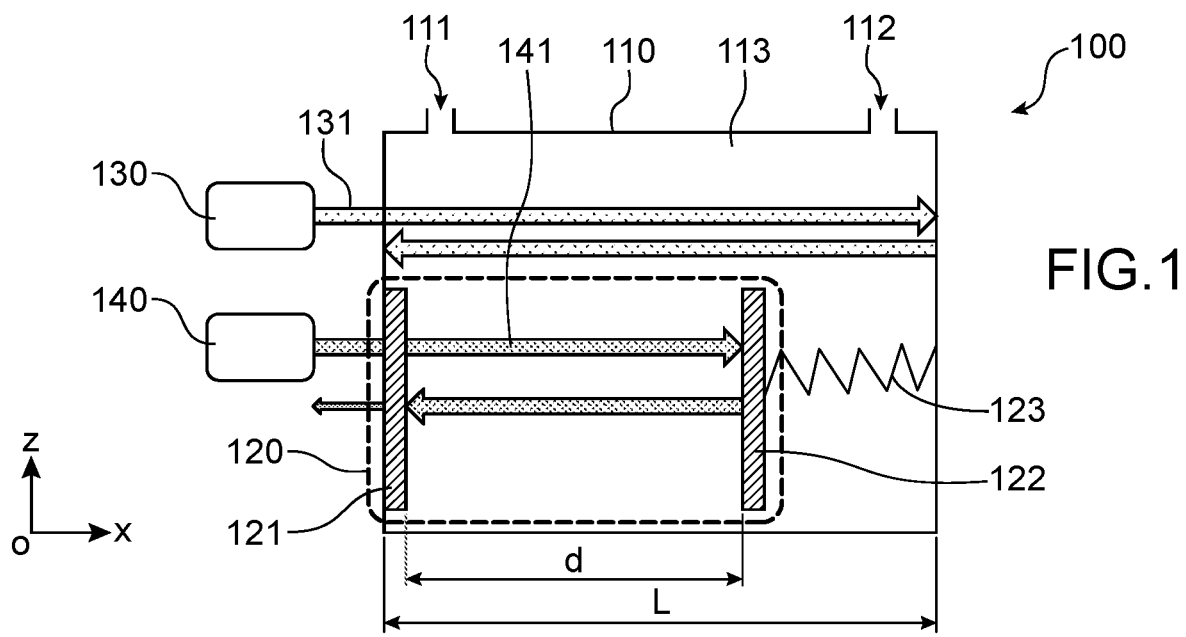
FIG. 1 illustrates schematically a first embodiment of a photoacoustic sensor according to the invention.

An illustration is provided, with reference to FIG. 1, of a first embodiment of a photoacoustic sensor 100 according to the invention.

The photoacoustic sensor 100 includes:
a measurement chamber 110;
an optical resonator 120 (herein an optical cavity);
an emission source 130 for emitting an excitation light beam, to carry out a photoacoustic excitation; and
an emission source 140 for emitting a measurement light beam, to carry out a concentration measurement of a gas in the measurement chamber as well as, in this case, to set the optical resonator 120 in self-oscillation.

The measurement chamber 110, or acoustic cavity, has the form of an enclosure 113 having an input opening 111 and an output opening 112, for the input, or output respectively, of a gaseous medium into, or from respectively, the measurement chamber 110. The interior of the measurement chamber 110 has herein, but not restrictively, a cylindrical shape of length L (dimension along the axis (Ox) of the generatrix of the cylinder).

In operation, the measurement chamber 110 is filled with a gaseous medium whereof it is sought to determine a characteristic. Hereinafter, said characteristic is a concentration of a predetermined gas.

The emission source 130 for emitting an excitation light beam emits at an absorption wavelength of said predetermined gas. It emits preferably in the mid-infrared (Mid-IR), at a wavelength between 1 µm and 15 µm, and more particularly between 3 µm and 12 µm. This range of wavelengths includes wavelengths useful for identifying numerous gaseous compounds, particularly alkanes, volatile organic compounds, sulphur or nitrogen oxides, etc. The source 130 emits for example at 4.26 µm, to detect a carbon dioxide gas concentration.

Alternatively, the emission source 130 for emitting an excitation light beam emits at a wavelength situated in the ultraviolet range, for example to detect ozone (at 254 nm).

The source 130 may consist of a laser, particularly a distributed feedback (DFB) quantum cascade laser (QCL), or DFB-QCL.

The source 130 emits a pulse type signal, the pulses being distributed according to a regular frequency annotated $f_1$.

The excitation light beam 131, emitted by the source 130, is propagated in free space in the measurement chamber 110, inside the measurement chamber 110. It may be conveyed to the measurement chamber 110 by an optical fibre, particularly a gradient-index fibre, or a chalcogenide fibre for Mid-IR.

In the presence of the predetermined gas in the measurement chamber 110, the excitation light beam 131 is partially absorbed, and generates a local temperature rise, which generates in turn an acoustic wave in the measurement chamber 110. The acoustic wave is amplitude-modulated, at the same frequency $f_1$ as the excitation light beam 131.

The excitation light beam 131 is propagated in the measurement chamber 110 along an axis parallel with the axis (Ox), where (Ox) is the axis of the generatrix of the cylinder defining the shape of the interior of the measurement chamber 110. Preferably, the frequency $f_1$ corresponds to an acoustic resonance frequency of the measurement chamber 110

The frequency $f_1$ must not exceed approximately 30 kHz, for the photoacoustic effect to be effective. Preferably, $f_1$ is less than or equal to 10 kHz.

The sensor may comprise focussing means, not shown, to focus the excitation light beam 131 in the measurement chamber 110.

The optical resonator 120 is situated inside the measurement chamber 110, in the measurement chamber 110.

It consists herein of a linear cavity, of the Fabry-Perot type, formed by two mirrors 121 and 122 arranged facing one another and spaced by a distance d. Preferably, the quality factor of the optical cavity is very high, greater than or equal to $10^4$, by means of high-quality mirrors (reflectivity greater than or equal to 99% for example).

The emission source 140 for emitting a measurement light beam emits a monochromatic beam, referred to as a measurement light beam 141, centred on a resonance wavelength of the optical resonator 120.

Preferably, the emission source 140 for emitting a measurement light beam emits at a wavelength between 400 nm and 800 nm, i.e. in the visible spectrum, at wavelengths for which there are photodetectors exhibiting excellent performances particularly in terms of signal-to-noise ratio. The source 140 may consist of a laser emitting in the visible range.

The measurement light beam 141, emitted by the source 140, is propagated in free space in the optical resonator 120, situated itself inside the measurement chamber 110. Preferably, the measurement light beam 141 is conveyed to the measurement chamber 110 by an optical fibre, particularly a gradient-index fibre.

Herein, the optical path of the measurement light beam 141 in the resonator 120, extends parallel with the optical path of the excitation light beam 131 in the measurement chamber 110.

The mirror 121 extends herein directly on an internal face of the measurement chamber 110. It may consist merely of a reflective coating on an internal face of said measurement chamber 110.

The mirror 122 extends herein inside the measurement chamber 110, mounted suspended inside the measurement chamber 110 and at a distance from the mirror 121.

According to the invention, the optical resonator 120 includes a movable and/or deformable mechanical element, suitable for moving in translation and/or being deformed under the effect of a pressure force, and returning to the initial position thereof or the initial shape thereof when it is no longer subjected to said pressure force. Herein, this movable and/or deformable mechanical element consists of the mirror 122.

In FIG. 1, a mere spring 123 has been represented, to illustrate the elastic return assembly of the mirror 122.

The mirror 122 consists for example of a flexible silicon nitride membrane, coated with a reflective coating. The membrane is arranged suspended inside the measurement chamber 110, mounted stretched about a supporting member, for example a silicon supporting member. The membrane can thus oscillate about a rest position, similar to a drum. Hereinafter, it is therefore referred to as "oscillating membrane". The oscillating membrane behaves like a mechanical element wherein the vibratory mass is attached to a spring. The surface area of the oscillating membrane is between $100*100\,\mu m^2$ and a few $mm^2$. The thickness thereof is between a few tens of nanometres and a few micrometres.

For clearer comprehension hereinafter, in FIGS. 2A and 2B, the link between the position of the mirror 122 and the position of the resonance peaks of the optical resonator 120 has been illustrated.

Figure 2A:
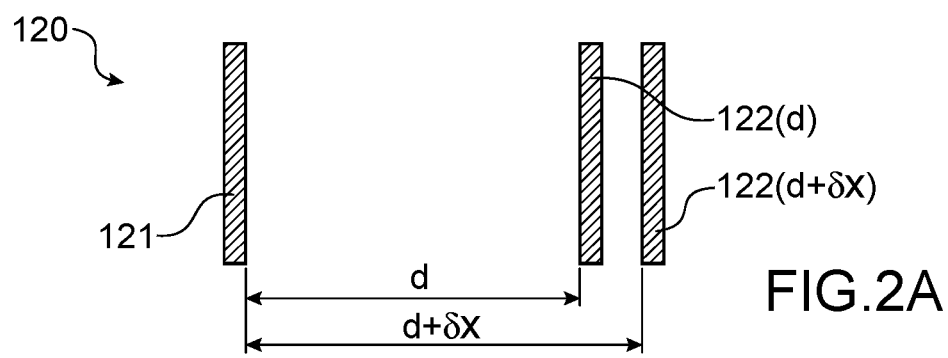
FIGS. 2A and 2B illustrate the link, in the sensor in FIG. 1, between the position of the displaceable mirror and the resonance wavelength of the optical resonator.

FIG. 2A illustrates the optical resonator 120, for two positions of the mirror 122, respectively at a distance d and at a distance d+δx from the mirror 121. The two positions of the mirror 122 are annotated 122(d) and 122(d+δx), respectively.

Figure 2B:
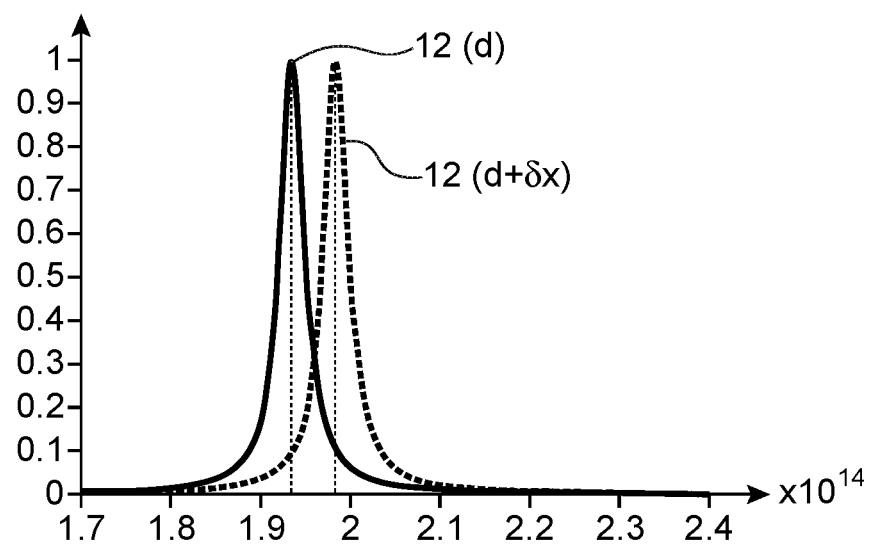

FIG. 2B illustrates the spectral position of the resonance of the optical resonator 120, formed herein by a resonant cavity, when the mirror 122 is situated at a distance d from the mirror 121, respectively d+δx. The x-axis is a frequency, the wavelength and the frequency being linked by the speed of light in a vacuum. The y-axis is a transfer function, with no units, corresponding to an energy density reflected or transmitted by the resonant cavity, and normalised to the unit at the maximum reflection or transmission. The resonance is conveyed by a peak, referred to as the resonance peak, on the transfer function of the resonant cavity as a function of the frequency thereof. It is seen in FIG. 2B that the spectral position of the resonance is dependent on the position of the mirror 122. The two positions of the resonance peak are annotated 12(d) and 12(d+δx), respectively.

It is noted herein that the resonance wavelength, whereon is centred the measurement light beam 141, is more particularly a resonance wavelength of the optical resonator 120 at rest. The optical resonator 120 is said to be at rest, in the absence of an acoustic wave generated in the measurement chamber 110, and in the absence of an optical signal confined in the optical resonator 120.

In operation, the measurement light beam 141 is confined in the optical resonator 120 and exerts on the mirror 122 a radiation pressure. This radiation pressure moves the mirror 122 slightly, which modifies the resonance wavelength of the optical resonator 120 very slightly. As the wavelength of the measurement light beam 141 no longer corresponds exactly to the resonance wavelength of the optical resonator 120, the radiation pressure exerted on the mirror 122 decreases, such that it returns to the initial position thereof, where it will once again be subject to a substantial radiation pressure. The mirror 122 thus carries out mechanical oscillation movement at a frequency $f_2$, referred to as self-oscillation of the optical resonator 120.

If the measurement light beam 141 is continuous, the frequency $f_2$ of the self-oscillation is fixed by the geometric characteristics of the optical resonator 120. If the measurement light beam 141 is a pulsed signal, the frequency $f_2$ corresponds to the pulse repetition frequency of the beam 141. The frequency $f_2$ of the self-oscillation is preferably greater than 100 kHz, and even greater than 500 kHz, for example equal to 1 MHz for such a macroscopic cavity. For a micro-resonator (see hereinafter), the frequency of the self-oscillation may exceed 100 MHz up to a GHz.

In operation, there is also generation, in the measurement chamber 110, of an acoustic wave oscillating at the frequency $f_1$. The optical resonator 120, and with it the mirror 122, are situated in said measurement chamber 110. Consequently, the mirror 122 is subjected to the pressure force exerted by the acoustic wave, annotated δp(t). This pressure force moves the mirror 122, according to an oscillation movement at the frequency $f_1$ of said acoustic pulses.

The frequency $f_1$ of the oscillation associated with the photoacoustic effect is substantially less than the frequency $f_2$ of the self-oscillation, with a ratio greater than or equal to 10 between the two, and preferably greater than or equal to 50.

The amplitude of the oscillation movement associated with the photoacoustic effect is substantially greater than that of the self-oscillation movement, since the pressure force exerted by the acoustic wave is substantially greater than the radiation pressure.

In practice, the amplitude of the movements and/or deformations of the movable and/or deformable mechanical element, herein the mirror 122, is sufficiently low so as not to influence the acoustic wave generated in the measurement chamber 110. This amplitude is of the order of a few nanometres, whereas the acoustic wavelength is of the order of one metre.

Herein, the maximum amplitude of the movement of the mirror 122 is of the order of a few nanometres, i.e. approximately 100 times less than the length of the optical resonator 120.

In operation, the slow and high-amplitude oscillation movement associated with the photoacoustic effect is combined with the rapid and low-amplitude self-oscillation movement.

Indeed, due to the link between the position of the mirror 122 and the position of the resonance peaks of the optical resonator 120, the movements of the mirror 122 are conveyed in real time by intensity variations on the beam 141 emerging from the optical resonator 120 after having completed several to-and-fro movements.

It is then possible to obtain information on the amplitude of the oscillation movement associated with the photoacoustic effect, based on an amplitude and/or phase measurement on the beam 141 emerging from the optical resonator 120.

It is particularly possible to measure an intensity variation on the beam 141 emerging from the optical resonator 120, depending on whether there is generation of an acoustic wave or not.

Additionally or alternatively, it is possible to measure a phase difference between the beam 141 entering the optical resonator 120 and the beam 141 emerging from the optical resonator 120.

Figure 3A:
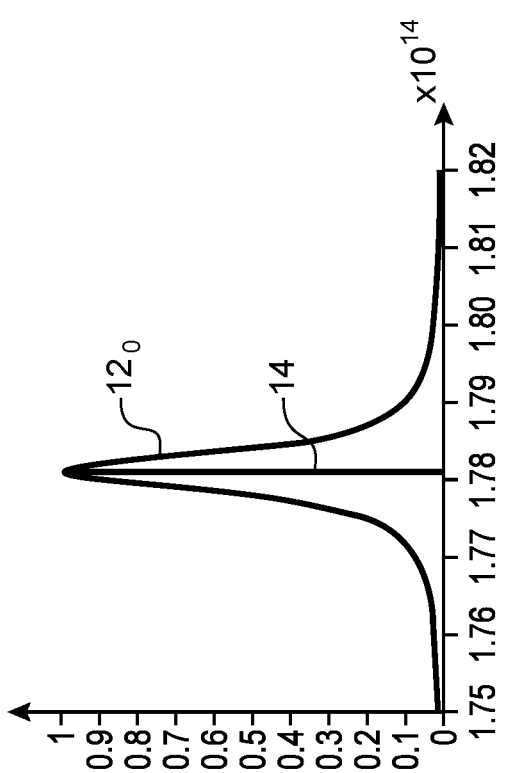
FIGS. 3A and 3B, respectively 4A and 4B, illustrate schematically the resonance of the optical resonator and the measurement light beam at the output of the optical resonator, in the absence, respectively in the presence, of an acoustic wave in the measurement chamber.

In FIG. 3A, a resonance peak $12_0$ of the optical resonator 120 has been represented, in the absence of an acoustic wave in the measurement chamber 110. The vertical line 14 represents the central wavelength of the measurement light beam 141, corresponding herein to the central wavelength of the resonance peak $12_0$. The line 14 is wide, to represent the translation amplitude of the resonance peak, associated with self-oscillation.

Figure 3B:
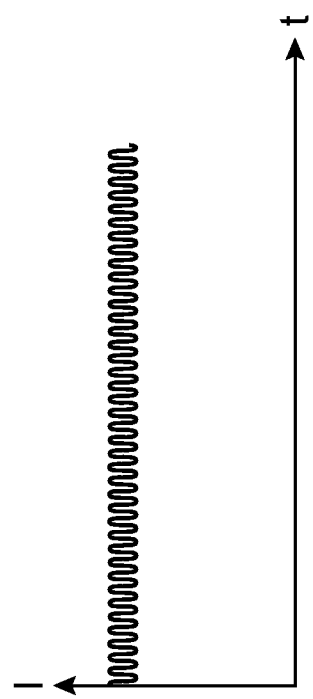

FIG. 3B illustrates schematically the corresponding variation of the intensity I of the measurement light beam 141, as a function of the time t. A single, high-frequency and low-amplitude oscillation is observed.

Figure 4A:
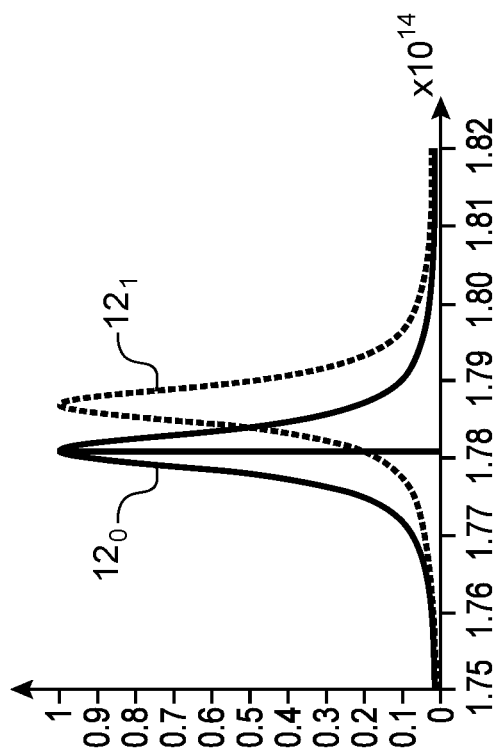

In FIG. 4A, the same resonance peak $12_0$ has been represented, in the absence of an acoustic wave in the measurement chamber 110. A position of this peak has also been represented, annotated as $12_1$, in the present of the acoustic wave in the measurement chamber 110. The resonance peaks $12_0$ and $12_1$ correspond to the two extreme positions of the resonance peak, in the presence of the acoustic wave in the measurement chamber 110.

Figure 4B:
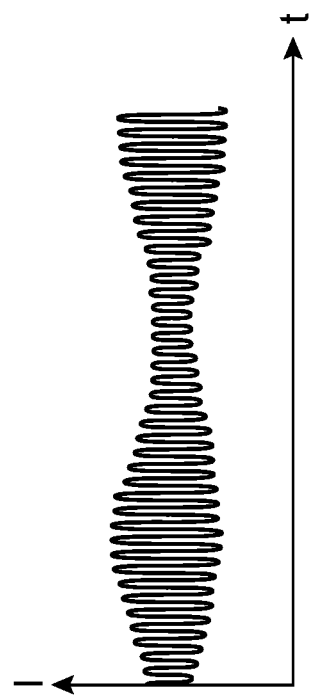

FIG. 4B illustrates schematically the corresponding variation of the intensity I of the measurement light beam 141, as a function of the time t. A low-frequency and high-amplitude component, modulating a high-frequency carrier, is observed schematically.

The properties of the low-frequency component are particularly dependent on the maximum amplitude of the acoustic wave, which is in turn dependent on the concentration of the predetermined gas in the measurement chamber 110. These properties are particularly the peak-to-peak amplitude and the input/output phase shift as defined above. The analysis of the measurement light beam 141 emerging from the optical resonator 120 therefore makes it possible to obtain the concentration of the predetermined gas in the measurement chamber 110.

In practice, a measurement is made on a reduced time window relative to the period of the acoustic wave. On this time window, the amplitude of the measured signal envelope is quasi-constant, which facilitates signal processing.

For example, a measurement is made on a time interval less than or equal to $1/5^{th}$ of the period of the acoustic wave, and event less than or equal to $1/10^{th}$ of this period.

If the parameter measured is an amplitude, the signal-to-noise ratio associated with the measurement may be reduced by a factor of about 10, in comparison with a sensor according to the prior art merely measuring a signal reflected on a movable element. This improvement is associated with the fact that the amplitude measurement is ultimately carried out on a high-frequency signal.

If the parameter measured is a phase shift, the signal-to-noise ratio associated with the measurement may be reduced by a factor of 100, in comparison with the same sensor according to the prior art. This improvement is associated with the use of a frequential type measurement on a high-frequency signal. The Brownian noise limit of the mirror 122, i.e. an absolute noise limit, may be attained.

Furthermore, and in a known manner, a vibration in an optical resonator may be detected up to a vibration amplitude substantially less than $10^{-12}$ m, possible even attaining $10^{-16}$ m. This is conveyed, in the sensor according to the invention, by a measurement resolution of three to four orders of magnitude less than those attained when a commercial microphone is used to measure the acoustic wave.

Figure 5:
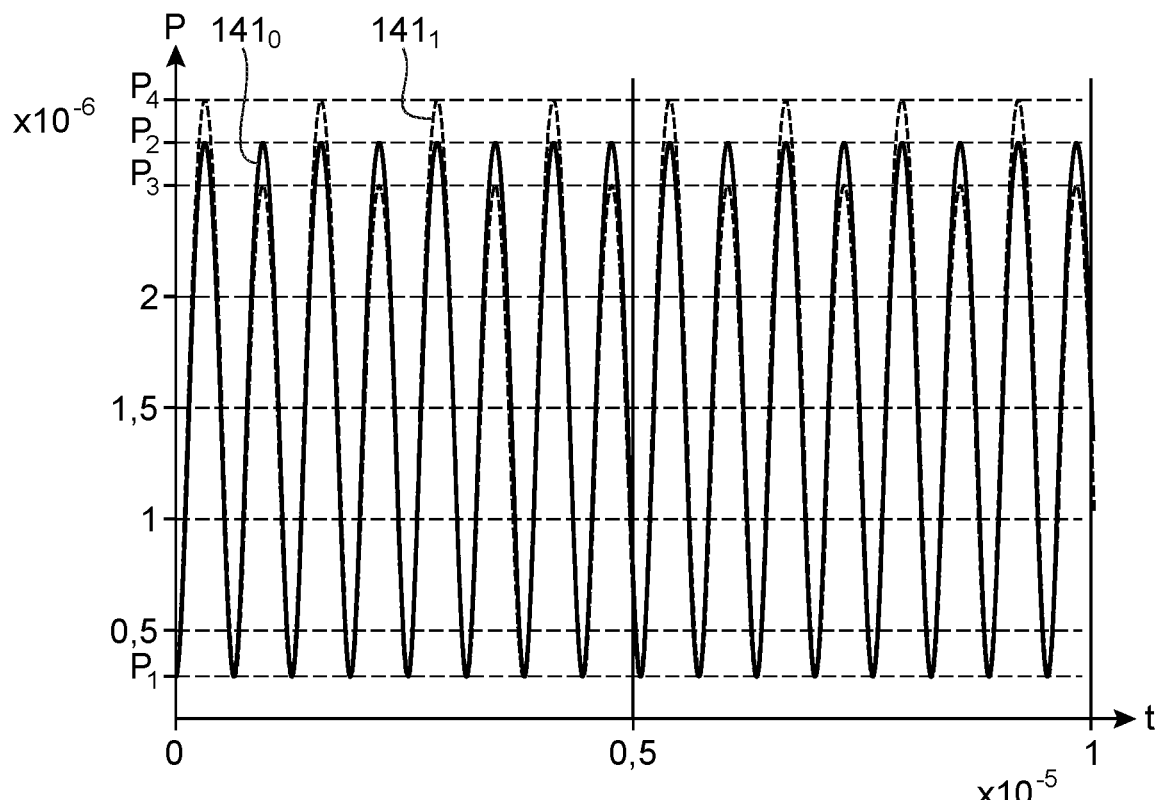
FIG. 5 illustrates a detail of a measurement light beam, at the output of the optical resonator.

FIG. 5 illustrates the power P of the measurement light beam emerging from the optical resonator 120, as a function of the time t, in the absence, respectively in the presence, of an acoustic wave in the measurement chamber (signal $141_0$, or $141_1$, respectively). The x-axis is graduated in seconds. The y-axis is graduated in Watts. The time window in question is 10 µs, for an acoustic period of 100 µs.

The signal $141_0$ oscillates between a power $P_1$ and a power $P_2$, at a frequency equal to double the frequency $f_2$ of the self-oscillation.

The signal $141_1$ has herein a component at a fundamental frequency (equal to double the frequency $f_2$ of the self-oscillation) and a component at a first harmonic (at a frequency equal to the frequency $f_2$ of the self-oscillation). It consists of pulses distributed at the frequency $f_2$ of the self-oscillation, oscillating between a minimum power $P_1$ and a maximum power adopting alternatively the value $P_3$ or $P_4$.

The inventors demonstrated that the power of the fundamental frequency varies in an increasing linear fashion with the pressure force exerted by the acoustic wave. Similarly, the power of the first harmonic varies in a decreasing and quasi-linear fashion with the pressure exerted by the acoustic wave. The power variations, of the order of a few µW, are compatible with the resolutions of commercial photodetectors.

Figure 6:
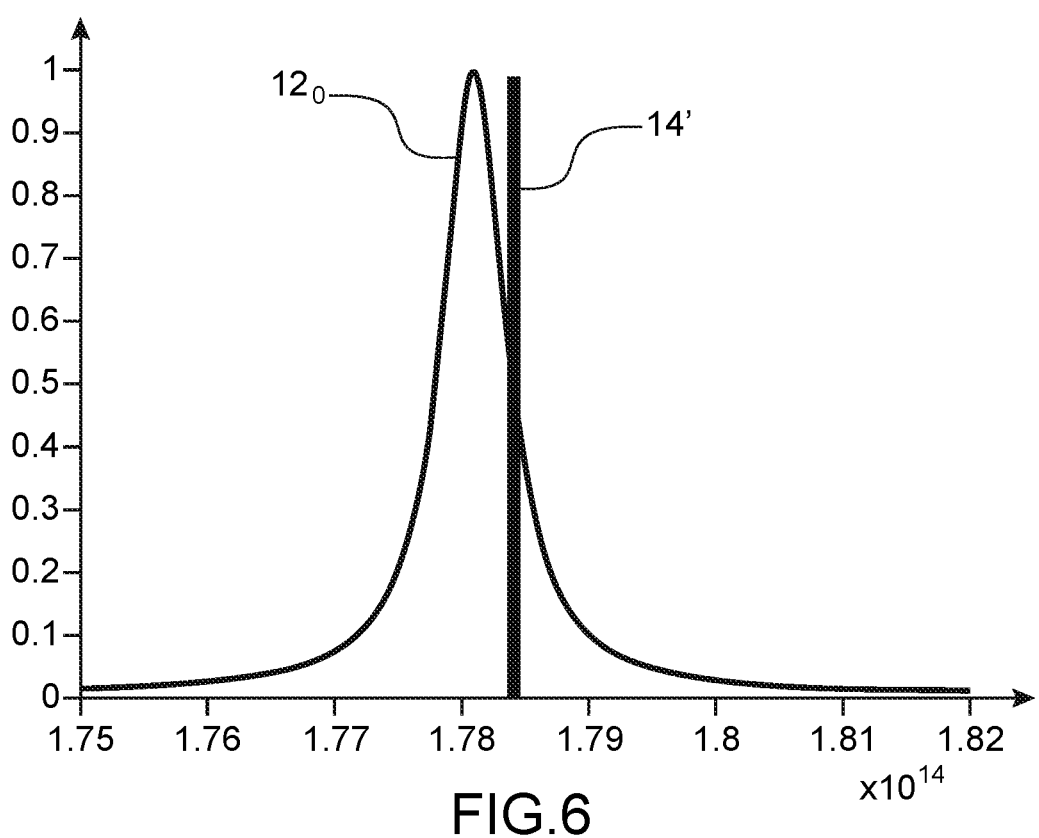
FIG. 6 illustrates schematically a positioning of the wavelength of the measurement light beam relative to a resonance peak of the optical resonator.

FIG. 6 illustrates an alternative embodiment wherein the measurement light beam is centred on a wavelength situated on a slope of a resonance peak $12_0$ of the optical resonator 120 at rest, at a distance from the amplitude maximum of this peak. The vertical line 14' represents the central wavelength of the measurement light beam 141. The line 14' is wide, to represent the translation amplitude of the resonance peak, associated with self-oscillation.

This alternative embodiment makes it possible particularly to amplify the variation of amplitude associated with self-oscillation, on the measurement light beam 141 emerging from the optical resonator.

It also makes it possible to ensure the linearity of the relationship between the movement and/or deformation of the movable and/or deformable mechanical element and the intensity of the measurement light beam emerging from the optical resonator. The occurrence of harmonics at frequencies different to $f_2$ is thus limited.

The measurement light beam 141, though centred on a separate wavelength from a resonance wavelength of the optical resonator 120, may nonetheless exert a sufficient radiation pressure to generate the self-oscillation movement described above.

Figure 7:
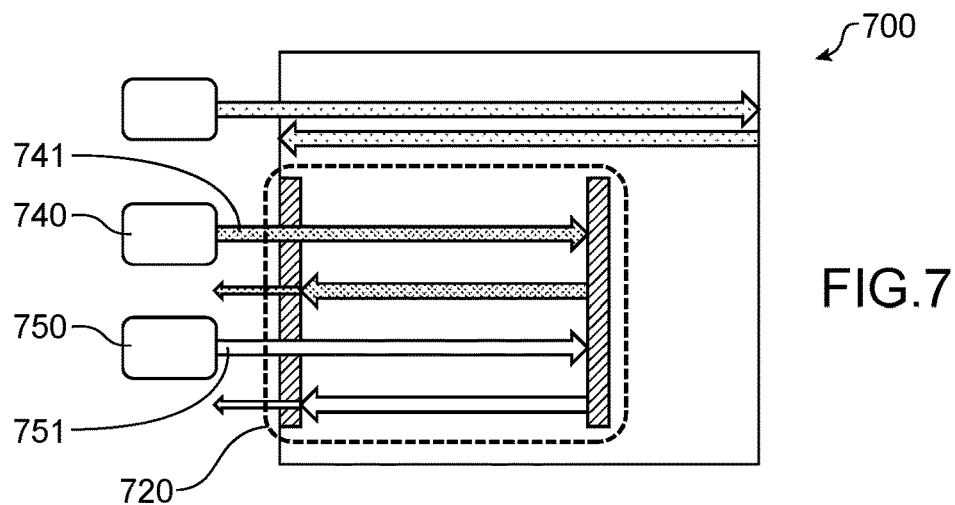
FIG. 7 illustrates schematically an alternative embodiment of the photoacoustic sensor in FIG. 1.

Alternatively, a third monochromatic beam is used, centred exactly on a resonance wavelength of the optical resonator 120, and separate from the measurement light beam 141, to exert the radiation pressure generating the self-oscillation. FIG. 7 illustrates a photoacoustic sensor 700 according to this alternative embodiment.

The photoacoustic sensor 700 will only be described for the differences thereof relative to the photoacoustic sensor in FIG. 1. The sensor 700 includes in particular:

an emission source 740 for emitting an excitation light beam 741, as described above; and an emission source 750 for emitting a light beam referred to as pump beam 751.

The excitation light beam 741 is a monochromatic beam centred on the slope of one of the resonance peaks of the optical resonator 720.

The pump beam 751 is a monochromatic beam centred on the maximum of one of the resonance peaks of the optical resonator 720.

Preferably, the respective central wavelengths of the excitation light beam 741 and of the pump beam 751 are situated on two different resonance peaks of the optical resonator 720.

The emission source 750 for emitting a pump beam may consist of a laser.

Figure 8:
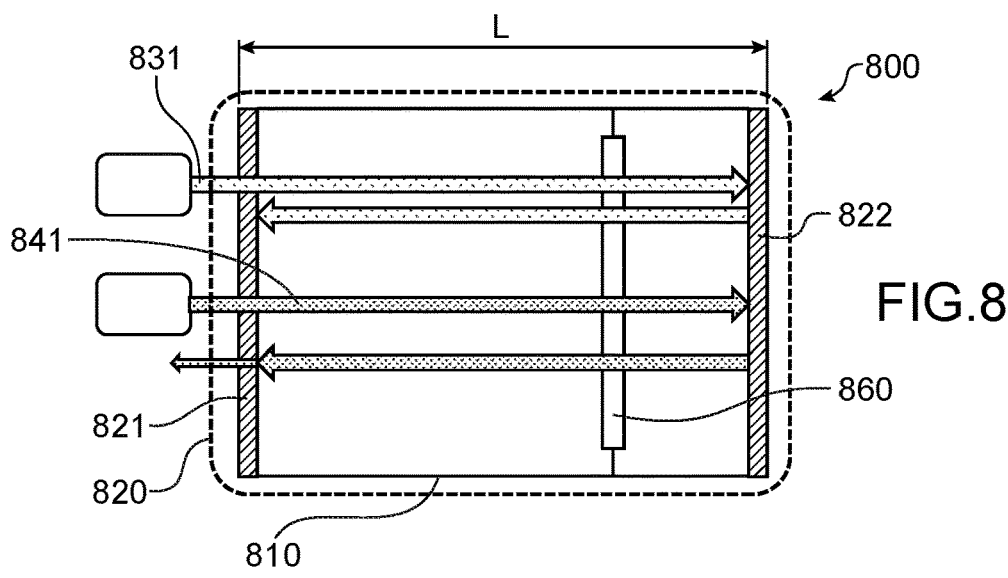
FIGS. 8 to 10 illustrate respectively second, third and fourth embodiments of a photoacoustic sensor according to the invention.

FIG. 8 illustrates a second embodiment of a photoacoustic sensor 800 according to the invention. This embodiment will only be described for the differences thereof relative to the embodiment in FIG. 1.

Herein, the optical resonator 820 is a linear resonant cavity, which extends along the entire length L of the internal volume of the measurement chamber 810. The two mirrors 821, 822 delimiting the linear cavity may each consist merely of reflective coatings deposited on two opposite internal faces of the measurement chamber 810.

Herein, the movable and/or deformable mechanical element consists of a flexible membrane 860, situated between the two mirrors 821 and 822. The flexible membrane 860 is for example made of silicon nitride, mounted stretched about a supporting member, as described above in respect of the mirror 122 and FIG. 1. Hereinafter, the flexible membrane 860 is referred to as "oscillating membrane". The oscillating membrane 860 is transparent at the wavelength of the excitation light beam 831, so as not to influence the photoacoustic effect, and quasi-transparent at the wavelength of the measurement light beam 841. The transmission rate at the wavelength of the excitation light beam 831 is advantageously greater than or equal to 95%, and even greater than or equal to 99%. The transmission rate at the wavelength of the measurement light beam 841 is advantageously greater than or equal to 90% and even greater than or equal to 99%.

The oscillating membrane 860 being quasi-transparent at the wavelength of the measurement light beam 841, it is subject to little or no radiation pressure exerted by the latter.

In operation, the measurement light beam 841 forms, in the resonant cavity, a stationary wave. The stationary wave is defined by nodes, where the amplitude variation thereof is nil, and antinodes, where the amplitude variation thereof is maximum.

According to this embodiment, the oscillating membrane 860 is placed on or in the vicinity of an antinode of this stationary wave. The position of the antinodes is defined in the absence of an acoustic wave in the measurement chamber 810.

The oscillating membrane is thus subjected, in operation, to an optical force due to the electric field gradient of the stationary wave. This optical force makes it possible to set the oscillating membrane in motion, according to a self-oscillation movement as described above. In other words, according to this embodiment, the self-oscillation of the movable and/or deformable mechanical element is generated not by a radiation pressure, but by an electromagnetic field. In both cases, the self-oscillation is generated by a so-called optical force, exerted by an optical signal confined in the optical resonator.

The oscillating membrane 860 is therefore suitable for being moved or deformed, both:

according to a slow oscillation movement, generated by an acoustic wave in the measurement chamber 810; and according to a rapid self-oscillation movement, generated herein by the electromagnetic field gradient of the measurement light beam 841 confined in the resonant cavity 820.

The movement and/or deformation of the oscillating membrane 860 are found on the optical properties of the measurement light beam 841. In particular, the dispersive effect of the oscillating membrane 860 on the stationary optical wave in the resonant cavity 820 is dependent on the position thereof, more or less close to an antinode of the stationary wave when it is moved or deformed about the rest position thereof. This dispersive effect will modify the refractive index seen by the stationary wave, and therefore the effective length of the resonant cavity, and thus change the optical resonance frequency thereof.

Advantageously, the optical resonator 820 is optically resonant, at the wavelength of the excitation light beam 831 also. The photoacoustic effect is thus increased in the measurement chamber 810, by increasing the energy at the wavelength of the excitation light beam confined in the measurement chamber 810

This embodiment can be combined with the embodiment in FIG. 7. In this case, it is a pump beam, separate from the measurement light beam, which generates the self-oscillation movement. The oscillating membrane 860 is placed at an antinode of the stationary wave coming from the pump beam and formed in the optical resonator 820, in operation. The oscillating membrane 860 is also transparent or almost at the wavelength of the pump beam.

Figure 9:
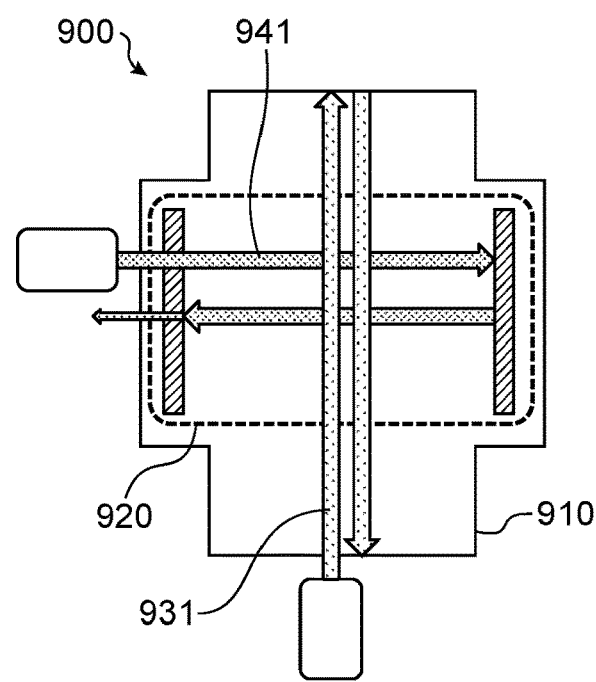

FIG. 9 illustrates a third embodiment of a photoacoustic sensor 900 according to the invention. This embodiment will only be described for the differences thereof relative to the embodiment in FIG. 1.

According to this embodiment, the photoacoustic sensor is arranged so that the optical path of the excitation light beam 931 in the measurement chamber 910 is orthogonal to the optical path of the measurement light beam 941 in the optical resonator 920.

It is thus possible to decorrelate the mechanical characteristics of the optical resonator 920 from those of the measurement chamber 910. In particular, the resonance frequency of the optical resonator may be set independently of the length of the acoustic cavity formed by the measurement chamber 910. It is thus possible to optimise, independently of one another, the photoacoustic effect and the optical detection.

Figure 10:
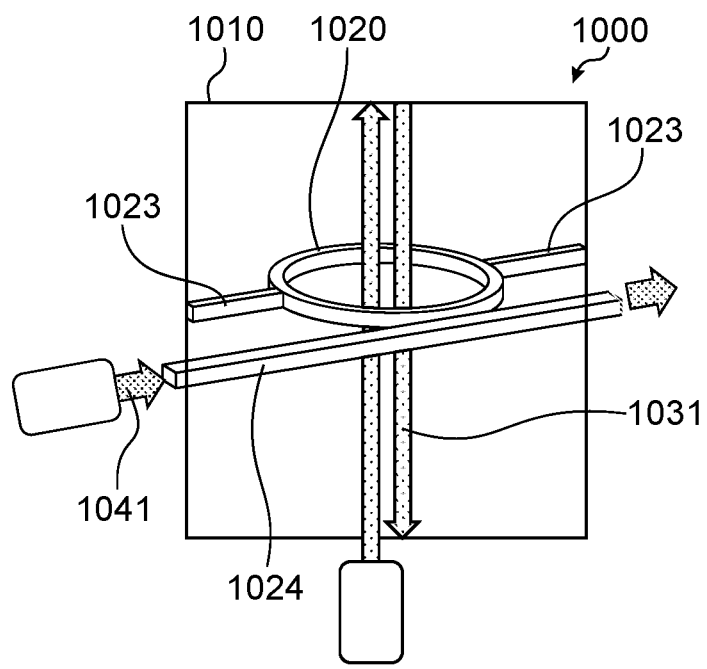

FIG. 10 illustrates, schematically, a fourth embodiment of a photoacoustic sensor 1000 according to the invention. This embodiment will only be described for the differences thereof relative to the embodiment in FIG. 1.

According to this embodiment, the optical resonator comprises a waveguide micro-resonator, in particular a micro-ring resonator 1020.

A waveguide micro-resonator includes a waveguide folded onto itself, or a series of elementary waveguides distributed in succession from one another, guiding the light along an optical path in the form of a closed loop. If the optical path is a circle, this is referred to as a micro-ring resonator. The dimensions of the micro-resonator may be less than one millimetre. Preferably, the waveguide is formed by a guide made of high-index semiconductor (Si, GaAs, etc.) or dielectric (SiN for example) material and by a lower-index cladding (silicon oxide, air, etc.).

The ring 1020 has a diameter between for example 5 µm and 100 µm, for a square or rectangular cross-section having a surface area between $10^4$ nm$^2$ and a few µm$^2$.

The ring 1020 is arranged suspended inside the measurement chamber 1010. It may be kept suspended by means of support arms 1023. Preferably, the arms 1023 are each arranged at the level of a node of the stationary wave confined in the ring 1020, in operation. The position of the node is defined in the absence of an acoustic wave generated in the measurement chamber. The stationary wave is formed by the measurement light beam, or, according to an alternative embodiment not shown, by a pump beam.

By means of the suspended arrangement thereof, the ring 1020 is suitable for being deformed radially according to a radial extension and contraction movement, such that the radius thereof increases, or decreases respectively. The ring is deformed in particular:
  according to a rapid movement of contractions and extensions, generated herein by the radiation pressure exerted by optical signal confined in the ring, herein the measurement light beam 1041 (self-oscillation); and
  according to a slow movement, essentially in the plane of the ring, generated by an acoustic wave in the measurement chamber.

The ring 1020 thus forms, furthermore, the movable and/or deformable mechanical element according to the invention.

Preferably, the excitation light beam 1031 circulates in the measurement chamber 1010 by passing inside the closed loop defined by the ring 1020.

Advantageously, the optical path of the excitation light beam 1031 in the measurement chamber 1010 is substantially orthogonal to the plane of the ring 1020, for example within plus or minus 10°.

The measurement light beam 1041 is conveyed into the ring 1020, in a manner known per se, by a linear waveguide 1024 arranged adjacent to the ring 1020. After several revolutions in the ring, the measurement light beam 1041 may emerge from the ring 1020 via the same linear guide, as represented in FIG. 10, or via a second linear waveguide also adjacent to the ring 1020.

Alternatively, the photoacoustic sensor further includes an emission source for emitting a pump beam, to generate the self-oscillation of the ring 1020. The photoacoustic sensor may then comprise a linear waveguide adjacent to the ring, for the injection and then extraction of the pump beam, and a second linear waveguide adjacent to the ring, for the injection then extraction of the measurement light beam.

The photoacoustic sensor 1000 has for example the following characteristics:
  micro-resonator: ring of radius R=50 µm and cross-section S=300*300 nm$^2$;
  force exerted on the micro-resonator by radiation pressure: a few pico-Newtons;
  self-oscillation frequency: $f_2$=126 kHz;
  acoustic wave frequency: $f_1$=2 kHz;
  mechanical quality factor of the acoustic resonator formed by the measurement chamber: $Q_m$=10 (hypothesis);
  resonance wavelength of the micro-resonator: $\lambda_r$=1.55 µm;
  free spectral range of the micro-resonator: FSR=2.3*$10^{11}$ Hz;
  optical quality factor of the micro-resonator: $Q_{opt}$=190000 (hypothesis).

Under these conditions, for an amplitude $\Delta p$=5 mPa of the pressure wave generated by the photoacoustic effect, the radius R of the ring varies by 1.6*$10^{-10}$ m.

It is thus possible to obtain a limit of detection less than 5 µPa for a measurement duration of 100 ms. This corresponds to a limit of detection which is an order of magnitude less than the state of the art, for a measurement duration which is also a an order of magnitude less.

The ring 1020, the support arms 1023 and the waveguide(s) 1024 may be produced with micro-technology, using the following steps:
  etching a thin layer deposited on top of a silicon substrate, to form the ring 1020, the support arms 1023 and the waveguide(s) 1024 (thin layer made of Si, or SiGe, or Ge, etc);
  etching of the material under the ring 1020, such that it is found to be arranged suspended.

The invention is not restricted to a waveguide micro-resonator wherein the waveguide is folded in the form of a ring. It also covers numerous further embodiments wherein the optical resonator is a waveguide resonator, suitable for guiding a light beam along an optical path in a closed loop, and arranged suspended inside the measurement chamber, with the movable and/or deformable mechanical element which is formed by the optical resonator itself. In particular, the optical path may have an oval shape.

According to further alternative embodiments, the micro-resonator arranged suspended in the measurement chamber rather comprises a micro-disk resonator, a spherical micro-resonator, a photonic crystal micro-resonator, etc. Here again, the micro-resonator also forms the movable and/or deformable mechanical element according to the invention. All these resonators are referred to as "micro-resonators", as they each have a very small size, with characteristic dimensions less than or equal to one millimetre.

Figure 11A:
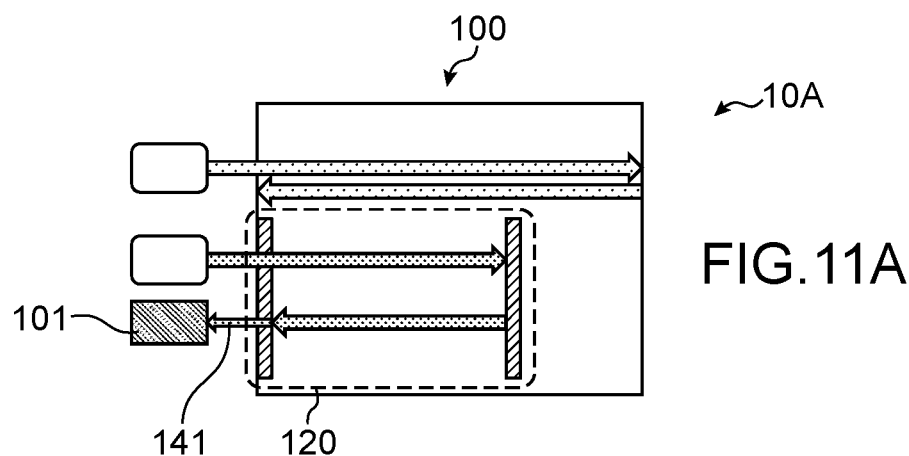
FIGS. 11A and 11B illustrate schematically two systems including a photoacoustic sensor according to the invention and means for carrying out a measurement on the measurement light beam emerging from the optical resonator.
Figure 11B:
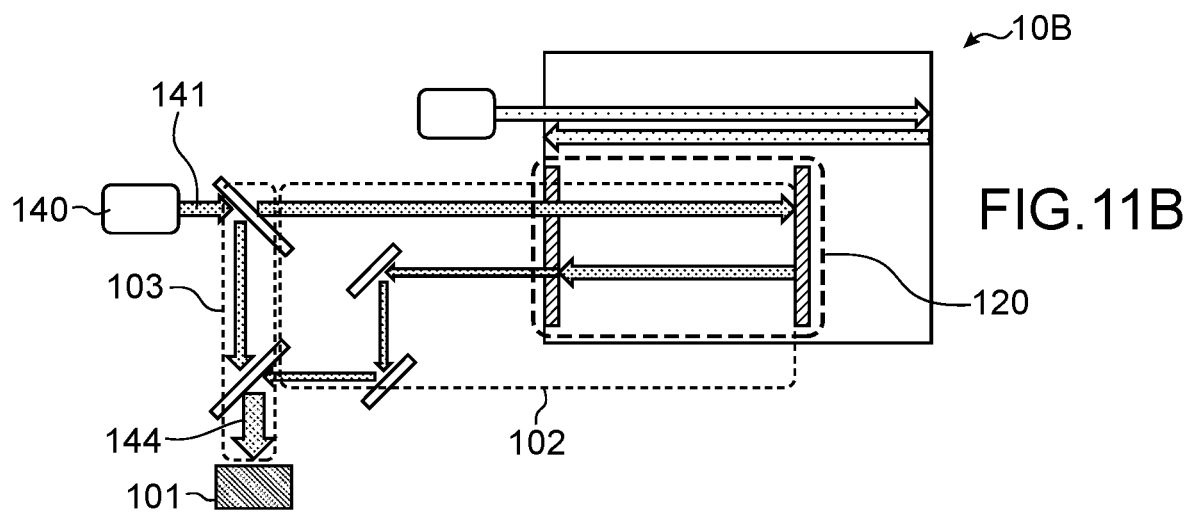

FIGS. 11A and 11B illustrate schematically two systems including a photoacoustic sensor according to the invention and means for making a measurement on the measurement light beam emerging from the optical resonator.

In FIG. 11A, the system 10A includes a photoacoustic sensor 100 as illustrated in FIG. 1, and a photodetector 101 arranged to receive the measurement light beam 141 emerging from the optical resonator 120 after having completed several to-and-fro movements therein.

The photodetector 101 measures a light intensity or a light power, as a function of time, at the wavelength of the measurement light beam 141.

In FIG. 11B, the system 10B includes a Michelson type interferometer.

The measurement light beam 141, emitted by the source 140, is separated into two sub-beams. One is directed towards a first arm 102 of the interferometer, including the optical resonator 110 of the photoacoustic sensor. The other is directed towards a second arm 103 of the interferometer.

The sub-beam, emerging from the optical resonator 110 after having completed several to-and-fro movements therein, is then combined with the sub-beam having circulated on the arm 103 of the interferometer. The combination of these two sub-beams produces an interference signal 144 which is received by a photodetector 101. It is thus possible to monitor, as a function of time, the difference between the phase of the measurement light beam entering the optical resonator 110 and the phase of said beam after having completed several to-and-fro movements in the optical resonator.

These two systems may further comprise computing means for processing the signal supplied by the photodetector 101 and inferring information therefrom relating to the gaseous or liquid medium in the measurement chamber. In other words, the invention also covers an installation including a photoacoustic sensor as described above, elements for carrying out a measurement on the measurement light beam emerging from the optical resonator (measurement of a peak-to-peak amplitude as a function of time, or of an input-output phase shift of the optical resonator as a function of time), and a computer to convert a measurement made on the measurement light beam emerging from the optical resonator into information relating to the gaseous or liquid medium in the measurement chamber, for example a concentration of a predetermined chemical species.

The invention therefore covers a photoacoustic sensor combining an optomechanical resonator and a photoacoustic cavity.

The photoacoustic cavity is formed by the measurement chamber, traversed by a pulsed excitation beam.

The optomechanical resonator is formed by the optical resonator, wherein a mechanical element is suitable for being set in rapid oscillations, by an optical signal confined in the optomechanical resonator, and in slow oscillations, by an acoustic wave generated in the photoacoustic cavity.

A measurement beam is sent into the optical resonator, where it completes several passages via the mechanical element. The optical properties thereof at the output of the optical resonator are therefore dependent on the oscillations of the mechanical element.

It is thus possible to obtain a low-frequency-amplitude-modulated high-frequency signal, wherein the amplitude modulation represents the acoustic wave in the measurement chamber.

The invention offers an accurate, low-noise, and highly compact solution for making measurements using a photoacoustic effect.

The invention is not restricted to the examples described above, and numerous alternative embodiments may be used without leaving the scope of the invention.

For example, a single light beam may form both the measurement light beam and the excitation light beam. In this case, the emission source for emitting the measurement light beam is merged with the emission source for emitting the excitation light beam.

The different alternative embodiments and embodiments may be combined together. In particular, each of the embodiments of a photoacoustic sensor may have an alternative embodiment without use of a pump beam, and an alternative embodiment with use of a pump beam, to carry out the mechanical self-oscillation of the optical resonator.

According to an alternative embodiment not shown, a single light beam may form both the pump beam and the excitation light beam. In this case, the emission source for emitting the measurement light beam is merged with the emission source for emitting the pump beam.

According to a further alternative embodiment, the optical resonator is a linear cavity with non-planar, for example concave, mirrors.

The example of an application to the measurement of a gas concentration has been developed, but further applications may be used without leaving the scope of the invention, for example mere detection of gas presence, infrared gas spectroscopy, visible or UV gas spectroscopy, liquid spectroscopy (preferably by adding a heating element to vaporise the liquid in the measurement chamber), etc.

The invention claimed is:

1. An element of a photoacoustic sensor comprising:
   a measurement chamber, suitable for containing a gaseous or liquid medium; and
   an emission source for emitting an amplitude-modulated excitation light beam which is modulated at a so-called excitation frequency;
   the element of a photoacoustic sensor being arranged such that the excitation light beam is propagated in the measurement chamber, and the excitation light beam having a spectral component suitable for generating a pressure wave in the measurement chamber in the presence of a predetermined characteristic of the gaseous or liquid medium, the pressure wave being referred to as an acoustic wave;
   wherein:
   an optical resonator, situated in the measurement chamber, and comprising at least one mechanical element which is movably mounted and/or deformable about an elastic return position or an elastic return shape; and
   an emission source for emitting a measurement light beam, separate or merged with the emission source for emitting the excitation light beam;
   the element of a photoacoustic sensor being arranged so that the measurement light beam carries out a plurality of passages in the optical resonator by passing via the movable and/or deformable mechanical element, and the movable and/or deformable mechanical element being suitable for being set in oscillation both by an optical signal confined in the optical resonator and by the acoustic wave generated in the measurement chamber, said confined optical signal in the optical resonator being formed by the measurement light beam or by a pump beam separate from the measurement light beam.

2. The element of a photoacoustic sensor according to claim 1, wherein the movable and/or deformable mechanical element is suitable for being set in oscillation by an optical signal confined in the optical resonator, at a mechanical self-oscillation frequency of the optical resonator, and wherein the mechanical self-oscillation frequency of the optical resonator is at least ten times greater than the excitation frequency of the excitation light beam.

3. The element of a photoacoustic sensor according to claim 1, wherein the measurement light beam has an emission peak centred on a measurement wavelength, the measurement wavelength being situated on a resonance peak of the optical resonator at rest, the optical resonator being described as at rest in the absence of the acoustic wave in the measurement chamber and in the absence of an optical signal confined in the optical resonator.

4. The element of a photoacoustic sensor according to claim 3, wherein the measurement wavelength corresponds to the maximum of said resonance peak.

5. The element of a photoacoustic sensor according to claim 3, wherein the measurement wavelength is situated on a slope of said resonance peak.

6. The element of a photoacoustic sensor according to claim 5, wherein the element of a photoacoustic sensor further has an emission source for emitting the pump beam, the pump beam having an emission peak centred on a wavelength corresponding to the maximum of a resonance peak of the optical resonator at rest.

7. The element of a photoacoustic sensor according to claim 1, wherein:
   the emission source for emitting the measurement light beam is separate from the emission source for emitting the excitation light beam;

the measurement light beam has an emission spectrum situated in the visible spectrum, between 400 nm and 800 nm; and the excitation light beam has an emission spectrum situated outside the visible spectrum.

8. The element of a photoacoustic sensor according to claim 1, wherein the optical resonator is a micro-resonator arranged suspended inside the measurement chamber, and wherein the movable and/or deformable mechanical element is formed by the optical resonator itself.

9. The element of a photoacoustic sensor according to claim 8, wherein the micro-resonator is suitable for guiding a light beam along an optical path in a closed loop, and wherein an optical path of the excitation light beam in the measurement chamber enters said closed loop.

10. The element of a photoacoustic sensor according to claim 1, wherein the optical resonator is a linear cavity delimited by two mirrors.

11. The element of a photoacoustic sensor according to claim 10, wherein one of the mirrors is arranged movable and/or deformable, and forms the movable and/or deformable mechanical element of the optical resonator.

12. The element of a photoacoustic sensor according to claim 10, wherein an optical path of the excitation light beam in the measurement chamber extends substantially orthogonal relative to an optical path of the measurement light beam in the optical resonators, within plus or minus 10°.

13. The element of a photoacoustic sensor according to claim 10, wherein an optical path of the excitation light beam in the measurement chamber extends parallel relative to an optical path of the measurement light beam in the optical resonator.

14. The element of a photoacoustic sensor according to claim 10, wherein the mirrors of the linear cavity also delimit the measurement chamber, and wherein the optical resonator further includes a movable and/or deformable membrane situated inside the linear cavity, and forming the movable and/or deformable mechanical element of the optical resonator.

15. A system comprising an element of a photoacoustic sensor according to claim 1, comprising an interferometer wherein one of the arms includes the optical resonator of the element of a photoacoustic sensor.

* * * * *